US008543907B1

(12) United States Patent
Roskind (10) Patent No.: US 8,543,907 B1
(45) Date of Patent: Sep. 24, 2013

(54) CONTEXT-SENSITIVE OPTIMIZATION LEVEL SELECTION

(75) Inventor: James A. Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 674 days.

(21) Appl. No.: 12/581,021

(22) Filed: Oct. 16, 2009

(51) Int. Cl.
*G06F 17/00* (2006.01)

(52) U.S. Cl.
USPC .......................................... 715/234

(58) Field of Classification Search
USPC ........................................... 715/234
See application file for complete search history.

(56) References Cited

U.S. PATENT DOCUMENTS

| | | | |
|---|---|---|---|
| 7,873,715 B1* | 1/2011 | Haber | 709/223 |
| 2002/0138526 A1* | 9/2002 | Crawford et al. | 707/530 |
| 2003/0033448 A1* | 2/2003 | Kieffer | 709/331 |
| 2004/0034814 A1* | 2/2004 | Thompson | 714/35 |
| 2006/0206884 A1* | 9/2006 | Creamer et al. | 717/147 |
| 2007/0198716 A1* | 8/2007 | Knowles et al. | 709/225 |
| 2008/0250310 A1* | 10/2008 | Chen et al. | 715/234 |
| 2008/0320498 A1* | 12/2008 | Maykov et al. | 719/320 |
| 2009/0049432 A1* | 2/2009 | Pirvu | 717/148 |
| 2009/0055821 A1* | 2/2009 | Grcevski et al. | 718/1 |
| 2009/0070873 A1* | 3/2009 | McAfee et al. | 726/23 |
| 2009/0276488 A1* | 11/2009 | Alstad | 709/203 |
| 2009/0281989 A1* | 11/2009 | Shukla et al. | 707/3 |
| 2009/0292791 A1* | 11/2009 | Livshits et al. | 709/217 |
| 2010/0312821 A1* | 12/2010 | Bannoura et al. | 709/203 |
| 2011/0154305 A1* | 6/2011 | Leroux et al. | 717/140 |

OTHER PUBLICATIONS

Suganuma et al., A Dynamic Optimization Framework for a JAVA Just-In-Time Compiler, ACM, Oopsla '01 Tampa Florida, 2001, p. 180-194.*
GCC Wiki, "LIPO—Profile Feedback Based Lightweight IPO." [online], [retrieved on Oct. 16, 2009]. Retrieved from the Internet <URL: http://gcc.gnu.org/wiki/LightweightIpo?action=print >, 11 pages.
Microsoft, "Description of the Just-In-time Compiler." Article ID: 15450—Last Review: Jan. 19, 2007—Revision: 3.1 [online], [retrieved on Oct. 16, 2009]. Retrieved from the Internet <URL: http://support.microsoft.com/kb/154580 >, 2 pages.
Wikipedia, "Just-in-Time Compilation." [online], [retrieved on Oct. 16, 2009]. Retrieved from the Internet <URL: http://en.wikipedia.org/wiki/Just-in-time_compilation >, 4 pages.
Wikipedia, "Profile-Guided Optimization." [online], [retrieved on Oct. 16, 2009]. Retrieved from the Internet <URL: http://en.wikipedia.org/wiki/Profile-guided_optimization>, 1 page.

* cited by examiner

*Primary Examiner* — Frank D Mills
(74) *Attorney, Agent, or Firm* — Fish & Richardson P.C.

(57) ABSTRACT

A method for selecting a performance optimization level for program code segments (e.g., JavaScript code) embedded in interactive webpages according to the origin (e.g., domain) of the webpages is disclosed. The information on historic usage behavior on webpages from the same origin is collected. The historic usage behavior can be specific to the current user or an average or aggregated behavior across many users who have visited webpages from the same origin. The historic usage information is used to select an appropriate level of optimization to achieve the maximum performance improvement for the least amount of compilation cost. The selected optimization level can be adjusted over time based on a measure of actual performance improvement resulted from the different levels of optimization that had been carried out during prior visits.

16 Claims, 7 Drawing Sheets

CONTEXT-SENSITIVE OPTIMIZATION LEVEL SELECTION

BACKGROUND

A web browser is a software application that identifies and retrieves information resources from the World Wide Web using Uniform Resource Locators (URLs) or Uniform Resource Identifiers (URIs) for the information resources. Examples of the retrieved information resources include webpages, images, videos, and other content. Hypertext Markup Language (HTML) is a markup language for composing webpages. The HTML source code for a webpage specifies the layout and appearance of text, images, and objects to be embedded in the webpage, for example. A layout engine of the web browser transforms the HTML source code and associated information resources (e.g., images, sounds, cascading style sheets, and so on) into an interactive document that is displayed in a browser window. Hyperlinks present in the webpage enable a user to navigate to related resources (e.g., other webpages) using the web browser.

Sometimes, the HTML source code for a webpage also includes or references program scripts that affect the behavior of the web browser. JavaScript is a scripting language that can be used for creating interactive webpages. A use of program scripts in an HTML document is to write functions that interact with the Document Object Model (DOM) of the webpage. Examples of this usage include opening new windows, validating web form input values, changing images in response to cursor movements, and so on. Because embedded scripts (e.g., JavaScript code embedded in an interactive webpage) run locally in a user's browser (rather than on a remote server), they respond to user actions quickly, making a web application feel more responsive.

JavaScript source code can be interpreted directly by a JavaScript engine of a web browser and executed in a virtual machine environment. Sometimes, the JavaScript source code is first compiled into an intermediate representation, known as the bytecode. The bytecode is then interpreted and executed in the virtual machine environment. Bytecode interpretation improves runtime performance over direct source code interpretation. Sometimes, JavaScript source code or bytecode is compiled into native machine code, and the machine code is executed natively to further improve runtime performance.

SUMMARY

In general, one aspect of the subject matter described in this specification can be embodied in a method that includes receiving from a server one or more segments of program code embedded in a webpage. A level of performance optimization is selected for the one or more segments of the program code according to an origin of the webpage. The selected level of performance optimization is performed on the one or more segments of the program code.

In some implementations, the origin of the webpage includes one of a domain name of a web server hosting the webpage, a file path of the webpage on the web server hosting the webpage, an identifier of a template used for creating the webpage, and an identifier of a creator of the webpage.

In some implementations, selecting the level of performance optimization further includes receiving information on a user's prior usage behavior on webpages from the origin of the webpage and the level of performance optimization is selected based on the information.

In some implementations, selecting the level of performance optimization further includes receiving information on aggregated usage behavior on webpages from the origin of the webpage, where the aggregated usage behavior is derived from prior usage behaviors of multiple users on the webpages from the origin. The level of performance optimization is selected based on the information.

In some implementations, selecting the level performance optimization further includes receiving a recommendation, where the recommendation specifies a recommended level of performance optimization for the webpage. The level of performance optimization is based on the recommended level of performance optimization.

In some implementations, the method further includes recording a measure of performance improvement due to the selected level of performance optimization being performed during a user's prior visit to another webpage from the origin of the webpage. The selected level of performance optimization for the webpage is then adjusted based on the measure of performance improvement.

In some implementations, the webpage is a search result supplied by a search engine, and the level of performance optimization is selected based on a recommendation by the search engine.

In one aspect, a method includes receiving from a first server one or more segments of program code embedded in a webpage. Information on aggregated usage behavior for webpages of a same origin as the webpage is received from a second server. A level of performance optimization is selected for the one or more segments of the program code according to the information. The selected level of performance optimization is performed on the one or more segments of the program code.

Other embodiments of these aspects include corresponding systems, apparatus, and computer programs, configured to perform the actions of the methods, encoded on computer storage devices.

Particular embodiments of the subject matter described in this specification can be implemented to realize one or more of the following advantages.

The optimization level for program code segments (e.g., JavaScript code blocks) embedded in a webpage is selected according to the origin (e.g., domain; or domain and file path, top-level-domain, protocol and domain, and so on) of the webpage. After the webpage is downloaded by a browser, the optimization level is selected for the webpage prior to analysis of the code pattern or execution profile of the embedded program code segments. Instead, the most suitable optimization level is predicted based on the origin of the webpage.

If extensive optimization is warranted for a webpage (e.g., the performance improvement outweighs the optimization overhead), an accurate prediction based on the origin of the webpage allows a user to realize the benefit of the optimization sooner than if Just-In-Time compilation or profile-based optimization techniques were used. Just-In-Time compilation does not compile a code segment until the code segment is actually invoked during the current browser session. Profile-based optimization is not invoked until the same code segment has been executed a sufficient number of times during the current browser session for sufficient profile data to be accumulated and analyzed. Optimization level selection based on the website origin allows a decision to optimize to be made immediately after the webpage is downloaded. The user does not have to wait for the browser to relearn during each browser session that optimization on a particular webpage would be beneficial.

Some browsers compile or optimize all JavaScript code in a webpage immediately after download (e.g., pre-deployment compilation and optimization). In situations where a minimal level of optimization is desired (e.g., when optimization overhead outweighs the performance improvement), an accurate prediction based on the origin of the webpage helps to avoid extensive optimization that does not produce benefit to the user. For example, when the user does not dwell on the webpage long enough, or does not use the webpage in a way that would benefit from the extensive optimization, a timely decision not to optimize produces the best performance to the user during the user's visit to the webpage.

In addition to the origin of the webpage, other context information (e.g., resource requirements of the program segments, usage behavior of the current user, aggregated usage behavior of many users, performance improvement due to different levels of optimization performed, and so on) can also be used to select and/or adjust the optimization level for a webpage. The context information for a webpage is optionally associated or not associated with a particular origin.

Context information for a webpage persists over multiple browser sessions either locally or on a remote server. Relevant context information accumulates over time to provide better guidance for selecting the most appropriate level of optimization to achieve the maximum performance improvement for the least amount of optimization overhead.

Context-based optimization level selection is not dependent on the exact code pattern in the embedded program code segments. Even if an embedded program code segment has been modified, selection of a suitable optimization level can be made without the need to reanalyze the embedded program code or waiting for sufficient profile data to be collected during the current browsing session.

Context-based optimization level selection is compatible with most optimization techniques available. Each kind of optimization technique can be an option built into the different optimization levels available for selection. For example, it is possible to employ Just-In-Time compilation for webpages from a particular origin, while employing pre-deployment compilation and optimization for webpages from a different origin. Other levels of performance optimization are also possible.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
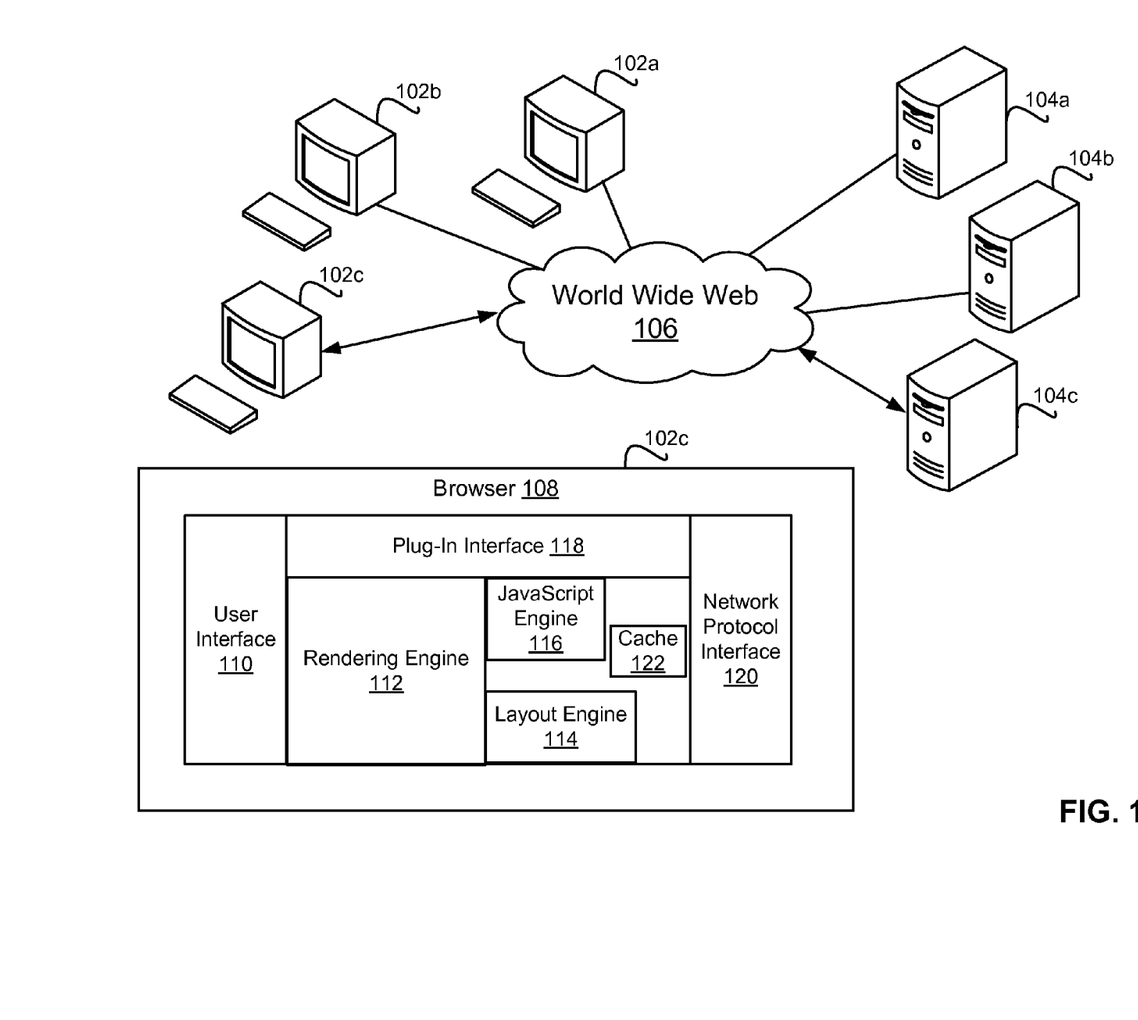
FIG. 1 is a block diagram illustrating an example web browser in a network environment.

FIG. 1 is a block diagram of an example software application (e.g., a web browser 108) in an internet environment including multiple client systems 102a-c and web servers 104a-c. The client systems 102a-c and the web servers 104a-c communicate through a network 106 (e.g., the World Wide Web).

The client systems 102a-c include software applications (e.g., web browser 108) for retrieving webpages and related information resources from the web servers 104a-c hosting the webpages. The software applications (e.g., web browser 108) have a graphical user interface for presenting the retrieved webpages to a user.

In a typical web browser (e.g., browser 108), a user enters a Uniform Resource Locator (URL) for a webpage (e.g., "http://www.gmail.com") in the web browser's address bar or clicks on a hyperlink embedded in a webpage currently displayed in the browser window in order to visit a desired webpage destination. The web browser (e.g., browser 108) identifies the hostname (e.g., "www") and the domain name (e.g., "gmail.com") in the URL and contacts the web server (e.g., server 104c) hosting webpages under that hostname and domain name according to the protocol (e.g., "http") identified in the URL.

The web server (e.g., server 104c) responds to the browser's request by sending the information resources identified by the URL to the browser (e.g., browser 108 on client system 102c). The information resources identified by the URL typically include source code written in the Hypertext Markup Language (HTML). The HTML source code identifies additional information resources needed to compose the webpage. The HTML source code of a webpage uses tags and refers to cascading style sheets (CSS) to create structure for the text, images, sounds, forms, tables, and other objects to be embedded in the webpage.

The HTML source code often also includes scripts written in languages such as JavaScript to create functions that affect the behaviors of the web browser and the webpage. The scripts are included as part of the HTML source code, or referenced in the HTML code and downloaded from a remote server. Other scripting languages are possible, however. Blocks of script code are identified in the HTML source code by the "<script> . . . </script>" tag. JavaScript is a scripting language used in composing webpages today. JavaScript code embedded in an HTML page enables programmatic access to objects within the web browser.

FIG. 1 shows some common components of a web browser (e.g., browser 108). For example, the browser 108 includes a graphical user interface 110 for presenting retrieved webpages to a user. The user interface 110 typically includes user interface elements for navigating within the browser 108 (e.g., backward, forward, home, etc.). Sometimes, the browser 108 stores bookmarks (e.g., links) to pages previously visited by a user using the browser 108.

The browser 108 includes a rendering engine 112 for rendering the downloaded webpages in the browser window and interprets user input such as mouse clicks on particular portions of the displayed webpage. A layout engine 114 of the browser 108 determines how the elements in an HTML page (e.g., text, images, tables, forms, objects, and so on) should be displayed according to the parameters specified in the HTML source code and the cascading style sheets (CCS) associated with the HTML page.

As part of the layout engine 114 or a standalone component, the browser 108 also includes a JavaScript engine 116 (e.g., a JavaScript interpreter) that interprets, compiles, and executes the JavaScript code embedded in or referenced from the HTML source code. Events detected from the user interface 110 are passed to the JavaScript engine 116 as input for JavaScript code processing and execution.

In a simple JavaScript engine, the interpretation is done from JavaScript source code, which results in delays in response time. Frequently, the JavaScript engine compiles the JavaScript source code into an intermediate representation, the so-called bytecode, before interpreting and executing the bytecode. Interpretation from the bytecode is faster than interpretation from the JavaScript source code directly. The bytecode is interpreted and executed in the virtual machine environment as well.

Although interpreting JavaScript code and executing the interpreted code in a virtual machine environment has their advantages (e.g., ensuring system security), the execution speed is slower than executing the code in the native machine code format. Therefore, most modern browsers include capabilities to compile the JavaScript code (in source code or bytecode format) into native machine code format, and to perform various code optimizations to improve run-time performance of the JavaScript code. Examples of the optimizations techniques include dead code elimination, loop unrolling, inlining, and so on.

The browser 108 also includes a plug-in interface 118 that allows incorporation of plug-in modules for processing of applets, embedded media objects like Portable Document Format (PDF) files, Quicktime movies, Flash animations, ActiveX controls, and so on. The browser 108 can supports many network protocols on different levels of abstraction. For example, the network protocol interface 120 supports application layer protocols (e.g., FTP and HTTP) to retrieve documents from servers and transport layer protocols (e.g., TLS/SSL and Socks) to establish connections for the application protocols.

In addition to the outward facing components, the browser 108 includes a cache 122 to store recently accessed documents and image files. Cookies and prior user input (e.g., passwords entered by the user) can be stored in the cache 122 for use in a subsequent browser session (e.g., when the browser is closed and restarted at a later time).

FIG. 1 illustrates one example of a web browser. Many designs of web browsers are possible. In addition, although many examples in this specification are given in terms of JavaScript code, the techniques described in this specification are applicable to other scripting or programming languages used in webpages, as long as such scripting or programming languages are otherwise interpretable and executable by the browser. Examples of such other scripting and programming languages include Perl, Python, VBScript, PHP, Java, and so on.

Figure 2:
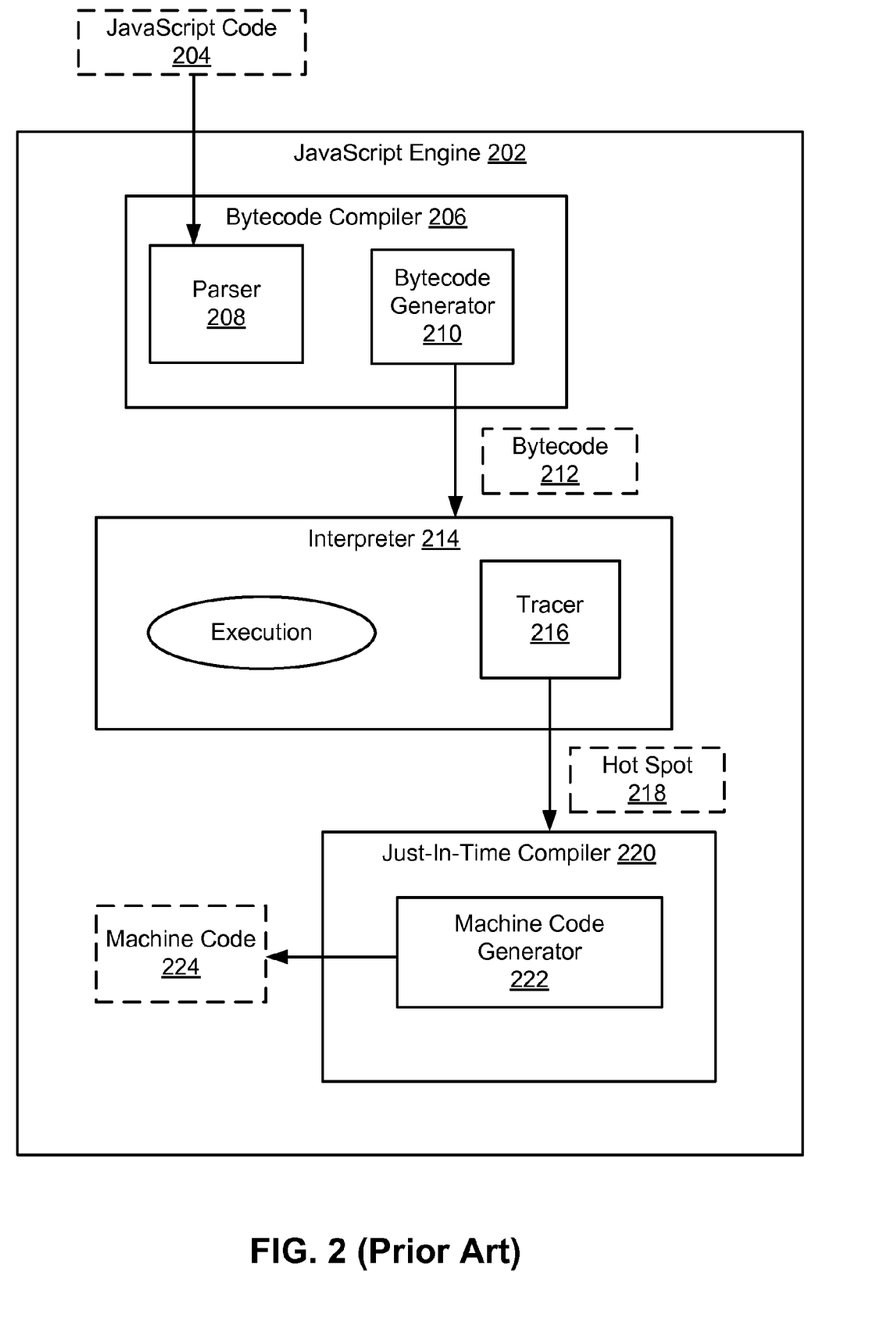
FIG. 2 is a block diagram illustrating an example JavaScript engine implementing a Just-In-Time compilation and profile-based optimization method.

FIG. 2 is a block diagram illustrating an example JavaScript engine 202 implementing a Just-In-Time compilation and profile-based optimization method.

Some modern web browsers compile individual blocks of JavaScript code into native machine code when they are first downloaded (e.g., in pre-deployment compilation). Compiling and optimizing scripts before they are actually invoked can result in a significant performance overhead when the size of the scripts is large. Sometimes the overhead caused by machine code compilation and optimization is not warranted if the improvement in runtime performance (e.g., in terms of memory usage and speed) is insignificant.

Just-In-Time compilation and profile-based optimization were developed to balance the compilation/optimization overhead and the improvement in runtime performance. FIG. 2 illustrates an example JavaScript engine 202 that implements a Just-In-Time compilation and profile-based optimization method. In the Just-In-Time compilation and profile-based optimization method, a segment of JavaScript code is not compiled into machine code until it is actually invoked and/or when the execution profile of the JavaScript code segment indicates that compilation and/or optimization of the code segment would results in significant performance improvement.

In FIG. 2, the example JavaScript engine 202 includes a bytecode compiler 206. The bytecode compiler 206 includes parser 208 and a bytecode generator 210. The parser 208 detects JavaScript code blocks in an HTML page currently being displayed. For example, when the parser 208 encounters a code block 204 tagged by "<script>~</script>," the parser 208 parses the JavaScript code block 204 and the bytecode generator 210 emits bytecode 212 corresponding to the JavaScript source code 204.

The bytecode 212 is input to the JavaScript interpreter 214 for interpretation. The interpreter 214 interprets and executes the bytecode 212 in a virtual machine environment. During the code execution, the interpreter 214 gathers information about the bytecode 212 and its execution behavior, and determines whether the code may benefit from certain optimization techniques.

In one example, the interpreter 214 includes a tracer 216 that detects so-called "hot-spots" (e.g., 218) in code pattern and execution behavior of the bytecode 212 during the current browser session. When these "hot spot" (e.g., functions, loops, variables, properties, etc.) are detected, the interpreter 214 notifies the Just-In-Time compiler 220 to compile the detected "hot spot" (e.g., a block of JavaScript code) into native machine code 224. The Just-In-Time compiler's machine code generator 222 applies various optimization procedures to the JavaScript code block that has been identified as a "hot spot." The compiled machine code is then executed natively on the browser's hardware.

There are several drawbacks with the Just-In-Time compilation and profile-based optimization method. First, a code block is not compiled until it is invoked, and the user will perceive a significant delay in the startup of a program or part of a program. Second, compilation and optimization are performed on one code block at a time, and many global optimization techniques cannot be utilized. Third, execution profile data (e.g., code execution patterns and usage behavior) is collected over time during the current browser session, and optimization decisions cannot be made until after the user has dwelled on the webpage for a significant period of time. An unfortunate scenario occurs when a user decides to leave a webpage soon after the browser finally decides that it is worthwhile to compile and optimize a particular block of code. So the user never actually experiences the benefit of the optimization while having endured the slow interpretation and execution of the un-optimized code initially, and also the delay caused by the subsequent compilation/optimization procedures. Lastly, the browser retains no information about the JavaScript code blocks executed in previous browser sessions. Each time, the decision to compile and optimize has to be made afresh, by examining the exact code patterns and execution profiles of the JavaScript code blocks.

Figure 3:
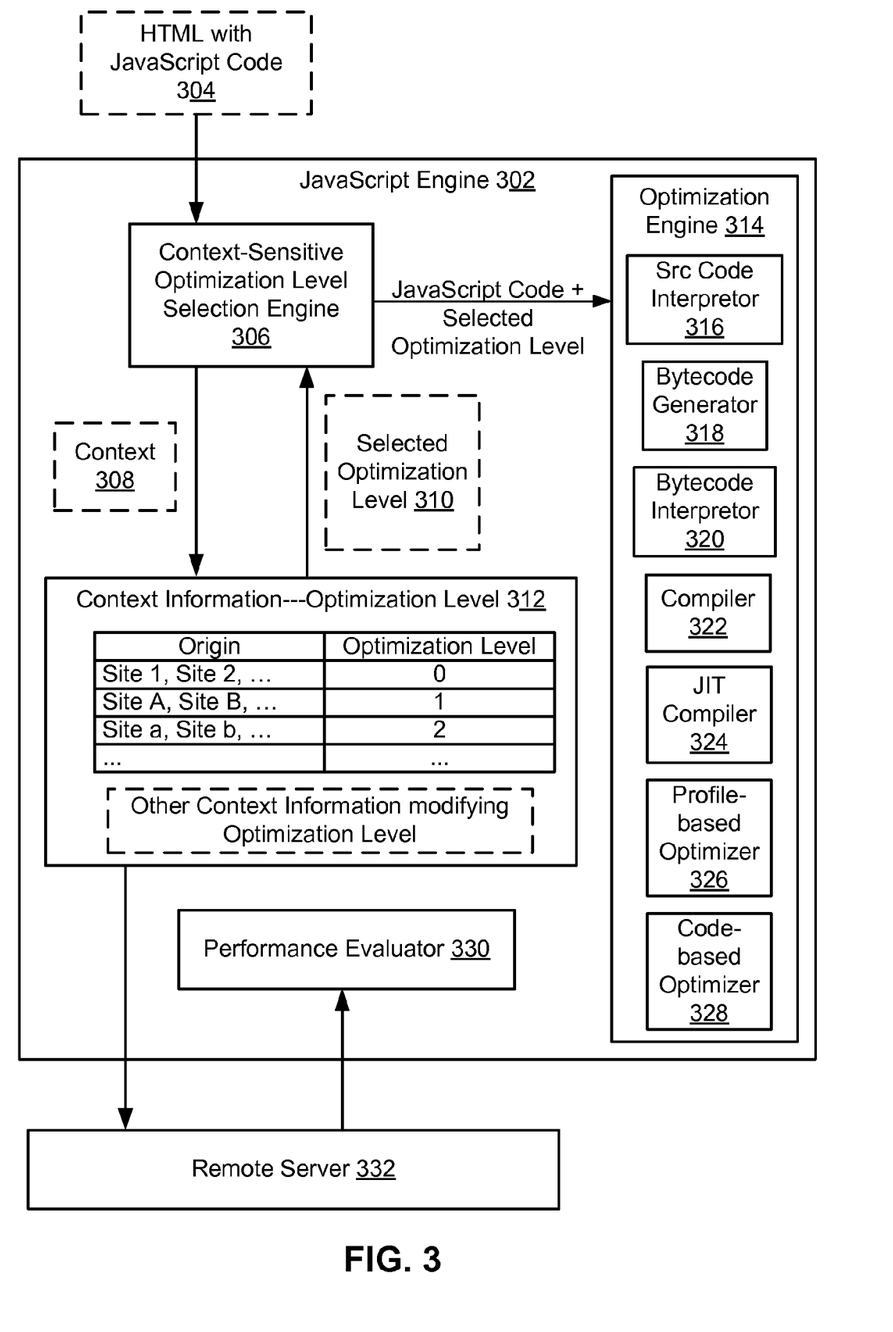
FIG. 3 is a block diagram illustrating an example JavaScript engine implementing a context-sensitive optimization level selection method.

FIG. 3 illustrates an example JavaScript engine 302 that implements a context-sensitive optimization level selection method. The context-sensitive optimization level selection method is compatible with the pre-deployment compilation/optimization method and the Just-In-Time compilation and profile-based optimization method described above, but has some distinct advantages over both. In some examples, the pre-deployment compilation/optimization method and the Just-In-Time compilation and profile-based optimization method represent two of several optimization levels or options that are available for selection according to the context of the webpage. Combinations of other compilation and optimization techniques are also possible choices available for selection according to the context-based optimization level selection method.

The context-based optimization level selection tailors the compilation and optimization level to the context of a webpage. In one example, the context for a webpage is the origin of the webpage. The origin of the webpage includes a domain name of the webpage or particular file paths under the domain name of the webpage. Although it is not guaranteed that all webpages from the same origin would benefit equally from the same level of performance optimization, the origin nonetheless is a good indicator for identifying webpages having similar structures and characteristics.

Heuristically, since webpages from the same origin are likely to have been developed by the same teams of web designers and programmers, the webpages tend to have similar structures, design elements, amount of JavaScript code, and code patterns. The programming habit and code reuse policies of the web design teams tend to result in webpages that have similar types and amounts of JavaScript code and enjoy similar levels of benefits from similar levels of optimizations. For example, webpages from a large interactive website would tend to have a large amount of JavaScript code and complex program logic, and would benefit greatly from optimization. In contrast, third-party hosted webpages for a small business may only contain a few blocks of simple JavaScript code, and would not benefit so greatly if the page is compiled or optimized. Therefore, the origin of a webpage is a good indicator for determining from the onset whether the JavaScript code in the webpage should be compiled and optimized. The decision based on the origin is simple and straightforward, and the prediction very often is correct.

Another example of a webpage's origin is a referral field that led to the display of the webpage. The referral field specifies, for example, the URL of a referral page, a search engine, or a bookmark. The nature and origin of the referral page and the knowledge of the search engine about the webpage as a search result (e.g., information retrieval score, average dwell time, click-through rate, popularity, etc.) provides insights into the nature and characteristics of the webpage which is used to select a suitable optimization level for the webpage. Typically, a bookmarked webpage is a webpage that the user tends to visit often, and compilation and optimization of a webpage referred to by a bookmark are likely to be consistently worthwhile or consistently wasteful.

A browser implementing the context-sensitive optimization level selection method retains context information (e.g., origins) about the webpages that a user has visited during prior browser sessions. In some implementations, the browser also retains information about the code execution patterns and usage behaviors on these webpages during those prior visits. Information on code execution patterns include, for example, presence of loops, presence of inter-procedural calls in loops, locations of dead code blocks, memory/resource requirements and so on. Information of usage behavior includes, for example, particular code blocks invoked by user actions, the number and frequency of particular functions that are invoked by the user actions, and so on. Furthermore, the browser sometimes also records the optimization levels previously selected for the webpages and the performance improvements resulted from the optimizations performed on those webpages.

In some implementations, based on the context information retained, a decision to compile and/or optimize, as well as the extent of compilation and optimization, is made when the webpage is downloaded (e.g., before the user has provided input to or interacted with the webpage). For example, if a user visits a news website and reads the front page news every day, although a different webpage is visited each day, all of those webpages are likely to benefit from the same level of compilation and optimization. Even though the exact code patterns in the webpages, the length of the webpages, and the embedded content items in the webpages may all be different, the webpages are nonetheless likely to benefit similarly from the same level of optimization. No analysis of the exact code patterns and execution profiles needs to be performed afresh during each browser session, and the selection of optimization level is made as soon as the webpage is downloaded based on the context of the webpage (e.g., the origin of the webpage, the historic usage behavior by the current user or multiple users, resource requirements of the webpage, and so on).

In some implementations, the information needed for context-sensitive optimization selection is collected over time and supplied to a browser by a third party server. The third party server collects information on webpage characteristics and code execution behaviors across a multitude of users and hardware platforms, and provides recommendations for suitable optimization levels based on the collected information. The accuracy of the recommendations is improved over time as more data is accumulated about webpages and their origins.

In the example shown in FIG. 3, an HTML document 304 is downloaded by a browser. The HTML document 304 is a webpage containing JavaScript code segments. The browser includes a JavaScript engine 302. The JavaScript engine 302 includes a context-sensitive optimization level selection engine 306. When the webpage 304 is downloaded, the context 308 of the webpage is determined, for example, by the context-sensitive optimization level selection engine 306. In some implementations, the context 308 of the webpage refers to the origin of the webpage. In one example, the origin of the webpage (e.g., http://www.cnn.com/2009/TECH/08/07/twitter.attack/index.htm) is the domain name (e.g., www.cnn.com) of the website hosting the webpage. In another example, the origin of the webpage is a particular path of the website hosting the webpage (e.g., http://www.cnn.com/2009/TECH/).

The optimization level selection engine 306 consults a stored list 312 that associates particular contexts or origins of webpages with recommended optimization levels. In some implementations, the contexts (e.g., origins of the webpages, historic usage information, and so on) and corresponding optimization levels are stored in the browser's cache (e.g., as a look-up table). The list 312 shows different groups of websites that are suitable for different optimization levels including, for example, level 0: complete pre-deployment compilation and optimization; level 1: complete pre-deployment compilation with no optimization; level 2: Just-In-Time compilation; level 3: Just-In-Time compilation with profile-based optimization; level 4: bytecode interpretation only; level 5: source code interpretation only; and so on.

In some implementations, the optimization levels further specify the exact types of optimization techniques that are to be performed. For example, the optimization level specifies that webpages from certain origins are to be optimized with one or more optimization techniques such as dead code elimination, loop unrolling, deep inlining, and so on. The optimization level selection engine 306 also sets a default level of optimization for webpages that are not found in the list 312. The default level of optimization specifies, for example, that level x (e.g., minimum compilation or optimization, or only bytecode interpretation, just-in-time compilation, and so on) is to be performed.

In some implementations, the optimization level controls the extent of optimization and the resulting cost of optimization by specifying the amount of resources allocated to compilation or optimization. For example, a higher level of optimization can specify additional memory resources that is allocated to a compilation or optimization routine. The additional memory facilitates more complex optimizations and diminishes the retardation caused by extraneous garbage collections. An optimization level that specifies a desirable initial amount of allocated memory for a compiler, interpreter, or optimizer can be selected based the context information (e.g., origin, code execution pattern, program resource requirement, users' usage behavior, and so on) acquired in advance of the compilation, interpretation, and/or optimization of the current webpage.

Once the optimization level selection engine 306 selects an optimization level 310 based on the information in the list 312, the JavaScript code in the HTML document 304 is interpreted, compiled, optimized, and/or executed according to the selected optimization level 310 in the optimization engine 314. Different components in the optimization engine 314 are invoked and utilized according to the selected optimization level 310. The different components in the optimization engine 314 include some or all of, for example, a source code interpreter 316, a bytecode generator 318, a bytecode interpreter 320, a compiler 322, a Just-In-Time compiler 324, a profile-based optimizer 326, a code-based optimizer 328, and so on. The resulting bytecode and/or machine code are executed accordingly, either in a virtual machine environment or natively, in the JavaScript engine 302 when invoked. Not all components shown in FIG. 3 are necessary. Other components to enable additional optimization levels are possible.

In some implementations, the JavaScript engine 302 further includes a performance evaluator 330 that evaluates and records data on performance improvements resulted from the selected level of optimization. The recorded data is used to adjust optimization levels associated with the webpage or the origin of the webpage to achieve maximum amount of performance improvement with the minimum amount of optimization overhead.

In one example, the performance improvement is based on a comparison between the performance during the current browser session and a standard published by a third party source. Since different hardware may benefit differently from the same optimization procedures, the comparison helps each individual browser to fine tune the optimization level according to its own hardware characteristics.

In addition to the performance difference due to hardware capabilities of the browser system, user's usage behaviors also affect optimization efficiency. For example, if a user uses a particular type of functions extensively, that user may benefit greatly from the optimization of that particular function. On the other hand, if the user does not use certain functions extensively, the benefit resulted from the optimization of those functions is minimal. Using a stock trading website as a more specific example, if one user uses that website to run financial experiments and performs a large number of calculations, optimization of JavaScript code for those financial functions would result in vast performance improvement over the un-optimized code. On the other hand, if another user simply reads the data on the financial website without any particular interaction with the website, the optimization is likely to result in minimal improvement in performance to the user.

In some implementations, the information on particular user's usage behavior on webpages from a particular origin, along with the data on performance improvement due to different levels of optimization, is gathered and stored locally on the browser system. The data is subsequently used for fine tuning the selected optimization level for the webpages from that origin.

Examples of usage behavior information include the duration of the visit to the webpage, the amount of JavaScript present on the webpage, the amount and types of JavaScript code segments actually invoked during the user's visit, and so on. The usage behavior information for webpages from each origin persists through many different browser sessions and is cumulated over time. Therefore, as usage patterns emerge over time, the prediction for subsequent usage behavior on webpages from the same origin will be more accurate and the optimization level recommendation would be more appropriate.

In some implementations, the JavaScript engine communicates with the remote server 332 for context information and/or recommended optimization levels. In one example, the remote server 332 is an authority that makes independent evaluations of websites and provides optimization recommendations for the websites.

In some implementations, the usage behavior data and performance improvement data are submitted to the remote server 332. The server 332 uses the data received from a multitude of platforms and users to provide optimization recommendations for individual users, or users fitting certain demographic profiles. The server 332 aggregates and/or averages the usage behavior on the webpages from each particular origin, and provides a recommendation for the optimization level for the webpages from this origin.

In some implementations, the server's data analysis is tied to the demographic characteristics of the users submitting the data, and the recommendation for optimization levels are tailored based on each user's particular demographic characteristics. For example, on a popular social network website (e.g., facebook.com), people who are over 30 years old typically do not dwell on each page over 10 minutes each session, and do not perform extensive activities on the page. Therefore, for these users, less optimization is more appropriate. In contrast, people who are below 30 tend to dwell on the webpages from the website for hours at a time, and would benefit greatly from extensive optimization of the webpages from the website.

In some implementations, the third party server 332 that supplies the optimization level recommendations is a search engine. The search engine provides links to a great multitude of webpages as search results. Each search result optionally comes with a recommended optimization level. The search engine already collects user feedback data with respect to search results, additional data such as user demographic data, web surfing behavior, performance improvement data can be collected at the same time.

Figure 4:
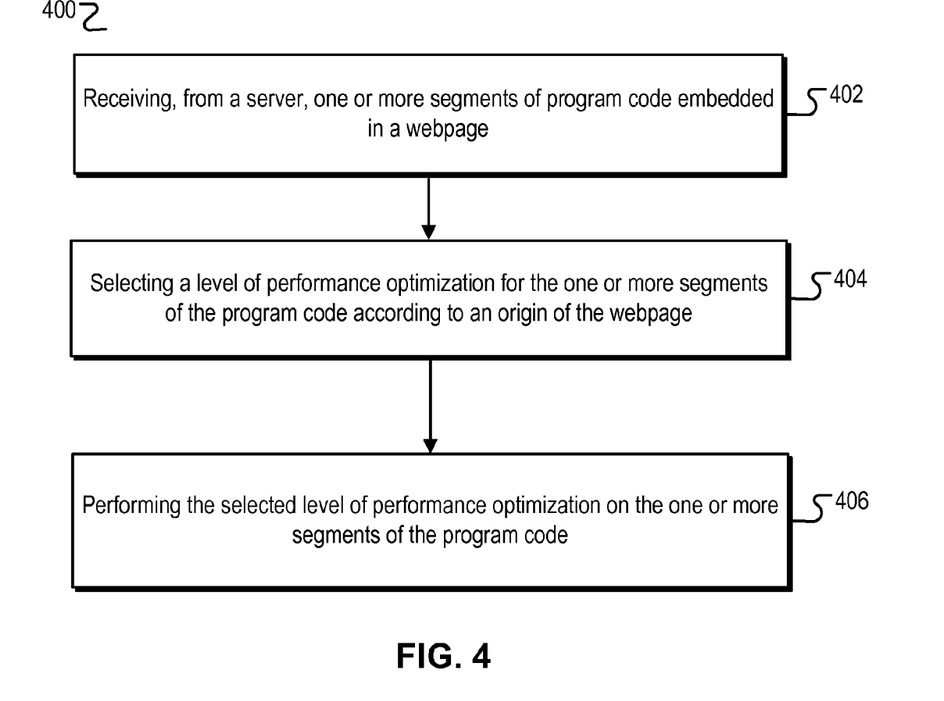
FIG. 4 is a flow diagram of an example process for selecting a performance optimization level for a webpage based on the origin of the webpage.

FIG. 4 is a flow diagram of an example technique 400 for selecting a performance optimization level for a webpage based on the origin of the webpage.

The process 400 starts when one or more segments of program code embedded in a webpage are received from a server (402). The one or more segments of program code are, for example, JavaScript code blocks embedded in a webpage written in HTML. Program code segments written in other languages are possible if they are otherwise interpretable and executable by the browser. The server is a web server hosting the webpage. In some example, the one or more segments of program code are included in the HTML source code. In other examples, references to the one or more segments of program code are included in the HTML source code, and the code segments are downloaded separately from the HTML source code itself. The one or more segments of program code are optionally stored in different files and include different functions. In some implementations, the one or more segments of program code are downloaded from different sources as well.

Once the one or more segments of program code are received by a browser, a level of performance optimization is selected for the one or more segments of the program code according to an origin of the webpage (404). In some implementations, the origin of the webpage is the domain name of the website hosting the webpage. Alternatively, the origin of the webpage is a particular path under the domain of the website hosting the webpage. Other definitions of an origin are possible. For example, each website may use a unique signature for all webpages or for each type of webpages on its website, and the origin of a webpage is the unique signature of the webpage. The signature is optionally a title of the website hosting the webpage, a name of a template that is used to generate the webpage, a name of a programmer or web design team, and so on. The principle for defining an origin is that webpages from the same origin typically adhere to similar programming practices, and therefore tend to benefit from the same level of optimizations.

In some implementations, the browser selects the level of performance optimization based on the origin of the webpage by consulting a data store that contains origins of webpages with a level of performance optimization associated with each origin. For example, the data store includes a table listing groups of webpage origins (e.g., website names or domain names) with respective associated levels of performance optimization (e.g., bytecode interpretation only, pre-deployment machine code compilation, pre-deployment compilation with full optimization, Just-In-Time compilation with loop optimization only, and so on). In some implementations, the different levels of performance optimization are specified in terms of the amount of resources (e.g., memory, processor cycles, and so on) that are allocated to the compiler, optimizer, and so on. A higher level of optimization means more memory and/or processor cycles are allocated for compilation/optimization of JavaScript code blocks after a webpage is downloaded, for example.

Once the level of performance optimization is selected based on the origin of the webpage, the selected level of performance optimization is performed on the one or more segments of the program code (406). Since the optimization level is selected based on the origin of the webpage, it is possible to make the selection prior to the code segments being invoked.

If it is known to the browser that webpages from a particular origin generally do not contain a lot of JavaScript, or contain only JavaScript that do not tend to benefit from extensive optimization, then a decision to perform less optimization for webpages from that origin is made based on the origin. Reduction in run-time delay is achieved due to a reduced level of compilation and optimization. This decision-making process is superior to compilers that optimize regardless of the need for optimization (such as those compilers implementing the pre-deployment compilation and optimization method).

On the other hand, if it is known to the browser that webpages from a particular origin would generally benefit greatly from extensive optimization. The decision to compile and optimize is made and the compilation and optimization are under way as soon as the JavaScript program code is downloaded. The browser does not have to wait until the code is actually executed or repeatedly executed to accumulate sufficient profile data before the compilation and optimization are performed. Therefore, after the initial delay due to the extensive optimization, the user can enjoy the benefit of the optimization. The browser does not have to relearn through actual code execution during each browser session that optimization on this webpage would be beneficial.

In context-sensitive (e.g., origin-based) optimization level selection, the decision to optimize is not tied to the exact code patterns (e.g., loops) in the code segments. Rather, the decision is tied to the context (e.g., origin) of the webpage. Even if a code pattern is modified or removed from a webpage, the optimization level selection would not be invalidated because the modified webpage likely has similar logic structure and code execution behavior as before. This distinguishes from profile-based optimization techniques since the profile-based optimization techniques require that the profile data generated by a piece of code can only be used to guide the optimization of the same piece of code.

FIGS. 5A-5D are flow diagrams of example techniques for selecting an optimization level based on various types of context information. In some implementations, the various types of context information are associated with a respective origin of a webpage. In other implementations, the various types of context information are independent of a respective origin of a webpage.

Figure 5A:
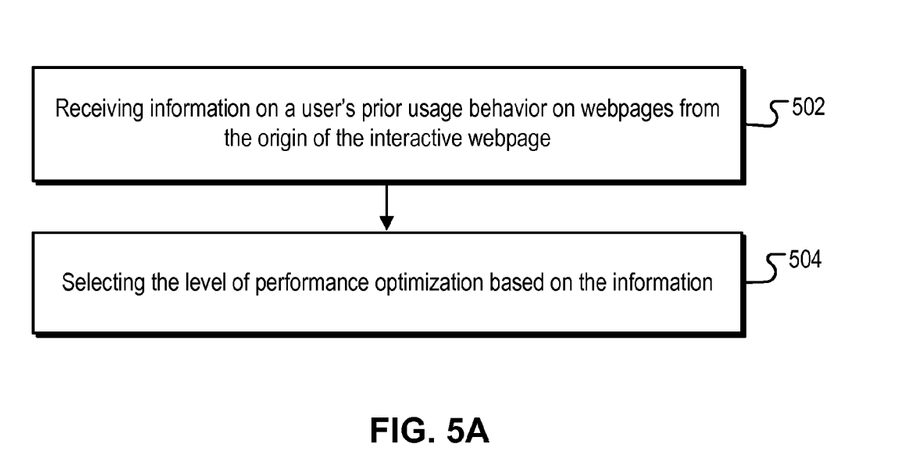
FIGS. 5A-5D are flow diagrams of example techniques for selecting a performance optimization level based on various types of context information.

FIG. 5A is a flow diagram for an example process for selecting an optimization level for a webpage based on a user's prior usage behavior on webpages from the same origin. In some implementations, in addition to the origin of the webpage, information on a user's prior usage behavior on webpages from the origin of the webpage is received (502). The user's prior usage behavior on webpages from the origin of the webpages is optionally collected and stored by the browser over many prior browser sessions over time. The user's prior usage behavior on webpages from the origin of the webpage is relevant for predicting the user's usage behavior on the webpage during the current browser session, because the user's usage behavior on webpages from the same origin are likely to be similar. For example, a user visiting a blog site is likely to stay on the page for the current day for a similar amount of time and to interact with similar sections of the page on different days. Different user's usage behaviors on the same webpage are likely to be different from one another. Therefore, the optimization level for each user is tailored to that user's particular usage behavior. For example, a user who enjoys providing comments after reading the blog during the user's visit may benefit from optimization for certain JavaScript code segments that manage user comments. In contrast, another user who only reads the blog would not benefit from extensive optimizations on those code segments in the webpage.

Once the information on the user's prior usage behavior is received, the level of performance optimization is selected based on the information on the user's prior usage behavior (504). In some implementations, the user's prior usage behavior on a particular webpage is stored locally, for example, with other context information (e.g., the origin of the webpage). The user's prior usage behavior is optionally categorized according to the durations of prior visits, the frequency of prior visits, the amount of JavaScript code invoked, and so on. Each category of usage behavior is optionally associated with a suitable optimization level.

In some implementations, the suitable optimization level for a webpage is adjusted over time when the usage behavior data accumulate over time to indicate a behavior pattern. In some implementations, the default optimization level is for optimizing to the maximum extent, and the optimization level for a webpage is gradually adjusted over time according to the user's prior usage behavior until an optimum level is reached. In some implementations, the default optimization level is to perform a minimal amount of optimization, and the optimization level is adjusted over time according to the user's prior usage behavior until an optimal level is reached. Other default starting level of optimization is possible.

Figure 5B:
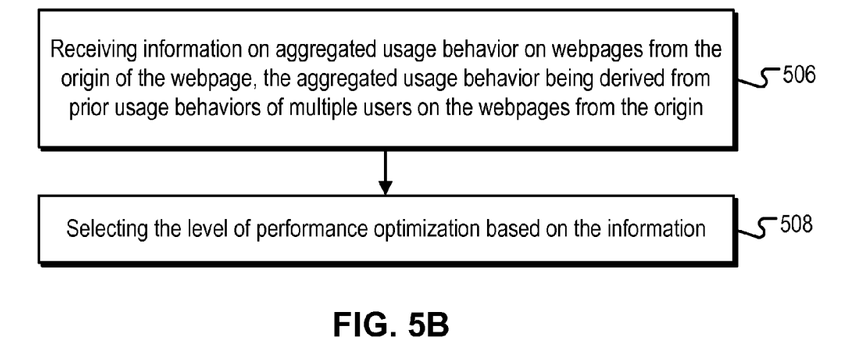

FIG. 5B is a flow diagram for an example process for selecting an optimization level for a webpage based on aggregated usage behavior on webpages from the same origin.

In some implementations, information on aggregated user behavior on webpages from the origin of the webpage is received (506). The aggregated usage behavior is derived from prior usage behaviors of multiple users on the webpages from the origin. In some implementations, the aggregated usage behavior is the average behavior of the multiple users (e.g., average dwell time on the webpage(s), average visit frequency to the webpage(s), amount of interaction with the webpage(s) during each visit, average amount of memory needed for processing, median amount of memory needed for processing, 95% of memory needed for processing, and so on). In some implementations, the aggregated usage behavior can be a weighted average of usage behavior from multiple users. For example, the usage behavior during the more recent visits is afforded more weight than the usage behavior during the more distant past. In some implementations, the aggregated usage behavior is derived using on a statistical model or machine learning model based on the usage behavior of the multiple users. Various methods for aggregating the usage behavior of multiple users are possible.

In some cases, the aggregated usage behavior is derived from prior usage behaviors of multiple users using the same browser system (e.g., different people sharing the same computer in a household). In some cases, the aggregated usage behavior is derived prior usage behaviors of a multitude of users who access the same webpage from their individual browser systems. In some cases, the aggregated usage behavior is derived from prior usage behaviors of a group of users that are using the same or similar types of hardware and/or software systems. In some cases, the aggregated usage behavior is derived from prior usage behaviors of a group of users sharing some common demographic characteristics (e.g., age, gender, income, profession, and so on).

A central server collects the usage behavior data from multiple users and analyzes the data to derive the aggregated usage behavior on the webpage, or on webpages from the same origin. The central server can then supply (e.g., in response to a request from a browser) the aggregated usage behavior to the browser when the webpage is downloaded to the browser. In some cases, the information on aggregated usage behavior is downloaded with the webpage from the web server. In other cases, the information is downloaded from a third party authority other than the web server hosting the webpage. In one example, the webpage is a search result provided by a search engine, and the level of performance optimization is based on a recommendation by the search engine.

Once the information on aggregated usage behavior on the webpage (or on webpages from the same origin) is received from the server, the level of performance optimization is selected based on the information (508). In some implementations, the information is used to adjust a current or default level of optimization associated with the origin of the webpage that has been set by the browser or the user.

Figure 5C:
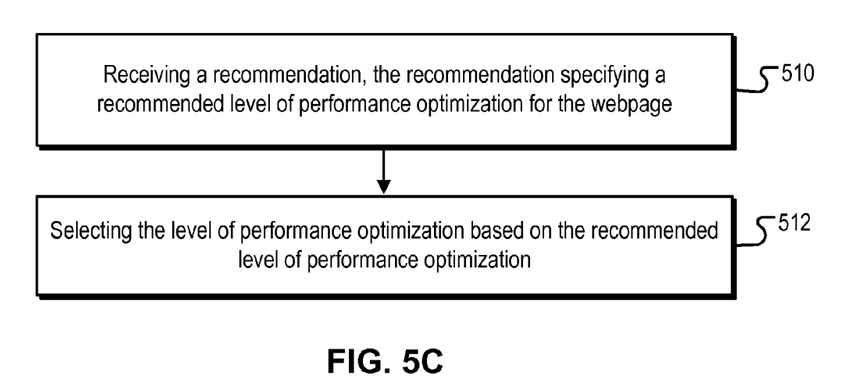

FIG. 5C is a flow diagram for an example process for selecting an optimization level for a webpage based on a recommendation from a remote server.

A recommendation is received from a remote server (510). The recommendation specifies a recommended level of performance optimization for the webpage. In some implementations, the recommendation from the server is based on measures of performance improvements that have resulted from various levels of optimization being performed on the webpage or webpages from the same origin. The remote server gathers performance statistics from different client devices that have downloaded the webpage or webpages from the same origin. The server determines a level of optimization that is likely to result in the most performance improvement with the least amount of optimization overhead. The server provides the determined level of optimization to a client device as a recommendation for the webpage or webpages from the same origin. The measure of performance improvement is optionally determined for each type of hardware and software system or for users fitting a particular demographic profile.

Once the browser receives the recommendation from the remote server, the browser selects the level of performance optimization for the webpage based on the recommendation (512). In some implementations, the browser accepts the recommended level of performance optimization as the selected level of performance optimization. In other implementations, the browser considers the recommendation as one factor among several factors (e.g., other context information) for selecting the level of performance optimization.

Figure 5D:
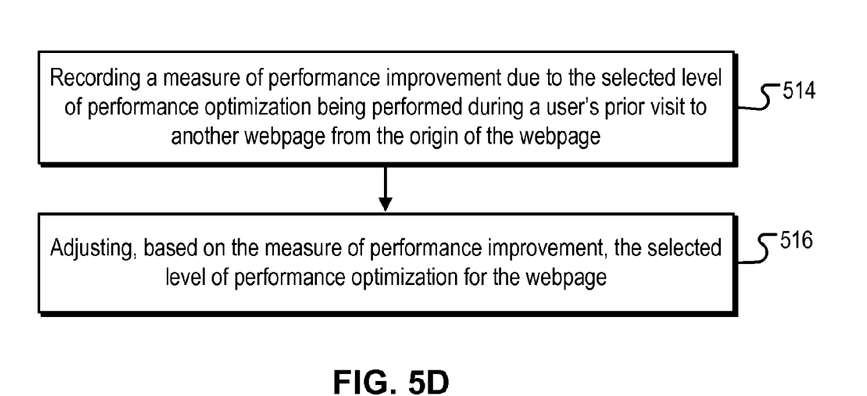

FIG. 5D is a flow diagram for an example process for adjusting the selected level of optimization for one webpage based on the performance improvement due to the selected level of optimization being performed on another webpage of the same origin.

The browser records a measure of performance improvement due to the selected level of performance optimization being performed during a user's prior visit on another webpage from the origin of the webpage (514). The selected level of performance optimization for the webpage is adjusted based on the measure of performance improvement (516).

Figure 6:
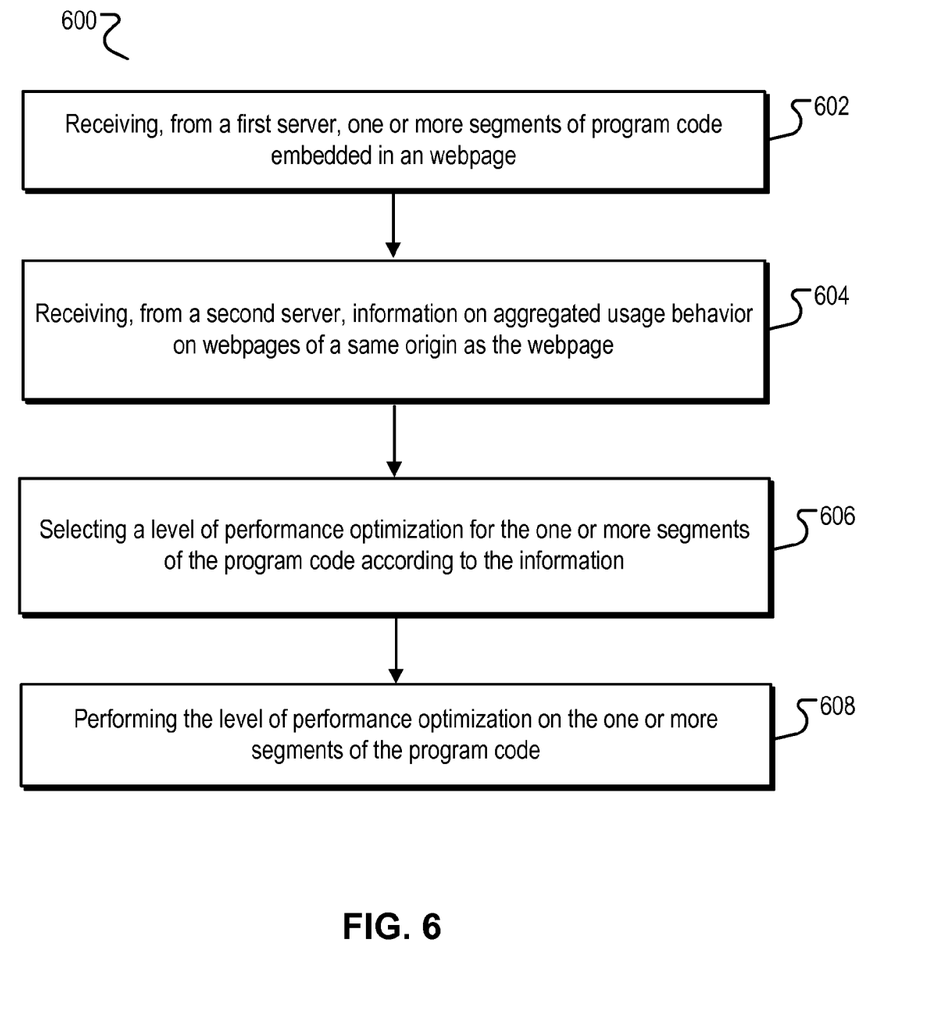
FIG. 6 is a flow diagram of an example technique for selecting a performance optimization level for a webpage based on aggregated usage behavior for webpages from the same origin.

FIG. 6 is a flow diagram of an example process 600 for selecting a performance optimization level for a webpage based on aggregated usage behavior for webpages from the same origin.

First, one or more segments of program code embedded in a webpage are received from a first server (602). The one or more segments of program code are, for example, JavaScript source code included or referenced in an HTML document. The one or more segments of program code are optionally stored in different files or as different program functions. The server of the one or more segments of program code is either a server of the webpage, or a server that serves the JavaScript code segments referenced in the HTML document.

Information on aggregated usage behavior on webpages from a common origin as the webpage is received from a second server (604). In some implementations, the second server is the same server as the server serving the program code segments. Information on the aggregated usage behavior include, for example, an average frequency of visits (e.g., a popularity measure), an average dwell time, an average amount of JavaScript code executed on the webpage, particular blocks of JavaScript code that are most often invoked in a user session, and so on. In some implementations, the received aggregated usage behavior is associated with a particular hardware, software, or user demographic characteristics.

A level of performance optimization for the one or more segments of the program code is selected according to the information on aggregated usage behavior on webpages from the common origin (606). In some implementations, usage behavior data is divided into value ranges, and each value range is associated with a particular level of optimization. In one example, the browser specifies that, if the popularity or usage frequency of webpages from a particular origin is above ten thousand visits per day, then the maximum amount of optimization should be applied; if the usage frequency is below two thousand visits per day, then no optimization should be performed; and if the usage frequency falls between the two numbers, Just-In-Time compilation with no optimization should be performed. In another example, the browser specifies that, if the average dwell time on the webpage exceeds one minute, then optimize; if not, do not optimize. Each user can specify his/her browser setting to based optimization level associated with a website on the average usage behavior on the website. The user's preference setting is stored locally in a cache area of the browser. After the browser receives the aggregated usage behavior information from a remote server, the browser consults the stored user preference to determine a suitable optimization level for the downloaded webpage.

Once the level of performance optimization is selected, the browser performs the selected level of performance optimization on the one or more segments of the program code (608). In some implementations, the selected level of optimization specifies that the code segments are to be compiled into native machine code and optimized to the maximum extent. In some implementations, the selected level of optimization specifies that the code segments are to be compiled into machine code only when the code is subsequently executed (e.g., Just-In-Time compilation). In some implementations, the information received from the server also specifies the code blocks that are most frequently executed, and selected level of performance optimization specifies that the most frequently executed code blocks are to be compiled and optimized if they are present in the current webpage. In some implementations, the selected level of optimization specifies the amount of resources (e.g., memory, processor cycles, etc.) that are allocated to the compiler and/optimizer. Various combinations of optimization options are possible, and each combination is available for selection according to the preference of the user and the received information on aggregated usage behavior.

In some implementations, the run-time performance of the program code and the user experience on the webpage are recorded for multiple browser sessions over time, and the user preference is adjusted by the user or by the browser system through machine learning techniques to find the optimal level of performance optimization for webpages from each origin.

Figure 7:
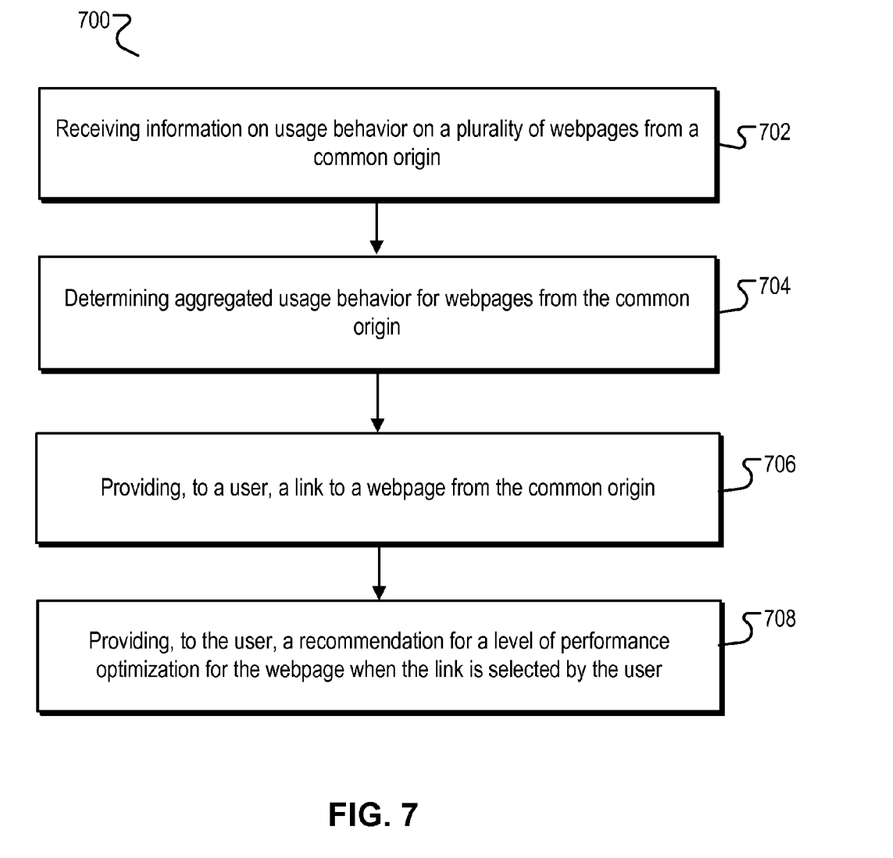
FIG. 7 is a flow diagram of an example technique for providing a recommendation on performance optimization level for a webpage based on aggregated usage behavior for webpages from the same origin.

FIG. 7 is a flow diagram of an example process 700 for providing a recommendation on an optimization level for a webpage based on aggregated usage behavior for webpages from the same origin.

In one example, the process 700 is implemented by a search engine. The search engine provides links to search results in response to user queries. The search results are typically ranked according to various quality scores, such as an information retrieval score, a popularity score, a quality score, and so on. The search engine also collects user feedback data that reflects users' opinions of these search results. Such data include click-through rate, click-through duration data, click-through reversal rate, and so on. Such user feedback data is used by the search engine to determine a recommended level of optimization on each search result when the link to the search result is selected by a user. Other information, such as performance statistics, are optionally collected and analyzed as well.

Each time a user retrieves a webpage by following the link for a search result on a search result page of the search engine, a mechanism for tracking the user's interaction with the search result can be invoked. Usage behavior information such as the dwell time of the user on the webpage, links that are clicked on, destinations of navigation from the webpage, and so on, can be collected by the tracking mechanism and forwarded to the search engine server. As user behavior information is tracked on many webpages, the search engine server receives information on usage behavior on a plurality of webpages from a common origin (702).

Based on the information received about the plurality of webpages from the common origin, aggregated usage behavior for webpages from the common origin is determined (704). The aggregated usage behavior includes, for example, the average dwell time, the average number of JavaScript code invoked during each visit, the type of JavaScript code blocks invoked during each visit, and so on.

Once the search engine server has accumulated a sufficient amount of usage information, the search engine can start to make recommendations for optimization levels for webpages. A link to a webpage from the common origin is provided to a user (e.g., on a search result page) (706). A recommendation for a level of performance optimization for the webpage is provided to the user (e.g., to the user's browser) when the link is selected by the user (708).

Context-sensitive optimization level selection is compatible with most compilation and optimization methods. For example, code-based optimization, profiled-guided optimization, no optimization, complete pre-deployment compilation into machine code, complete interpretation, Just-In-Time compilation, and so on, are all available options that can be selected based on the context of the webpage. Different optimization options can be turned on based on the context information as well. For example, deep inlining may work well with webpages from a particular origin, because the webpages from that origin are written in a way that would benefit from deep inlining. Other optimization options include, dead code elimination, loop unrolling, constant propagation, and so on. Different amount of resources can be associated with different levels of optimizations, and allocated to the compiler/optimization when the optimization level is selected.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    receiving, from a server, one or more segments of program code embedded in a webpage having an origin;
    receiving information on a user's prior code invocation behavior of code on webpages from the origin;
    selecting a level of performance optimization for the one or more segments of the program code in advance of compilation of the segments of the program code based on, at least, the received information, and wherein the level of performance optimization specifies a type of program code compilation optimization for the one or more segments; and
    performing, by a processor, the selected level of performance optimization on the one or more segments of the program code.

2. The method of claim 1, wherein the origin of the webpage includes one of a domain name of a web server hosting the webpage, a file path of the webpage on the web server hosting the webpage, an identifier of a template used for creating the webpage, and an identifier of a creator of the webpage.

3. The method of claim 1 wherein selecting the level of performance optimization further comprises:
    receiving second information on aggregated usage behavior on webpages from the origin of the webpage, the aggregated usage behavior being derived from prior usage behaviors of multiple users on the webpages from the origin; and
    selecting the level of performance optimization based on the second information.

4. The method in claim 1 wherein selecting the level of performance optimization further comprises:
    receiving a recommendation, the recommendation specifying a recommended level of performance optimization for the webpage; and
    selecting the level of performance optimization based on the recommended level of performance optimization.

5. The method in claim 1, further comprising:
    recording a measure of performance improvement due to the selected level of performance optimization being performed during the user's prior visit to another webpage from the origin of the webpage; and
    adjusting, based on the measure of performance improvement, the selected level of performance optimization for the webpage.

6. The method in claim 1, wherein the webpage is a search result supplied by a search engine, and the level of performance optimization is selected based on a recommendation by the search engine.

7. A computer storage medium encoded with a computer program, the program comprising instructions that when executed by data processing apparatus cause the data processing apparatus to perform operations comprising:
    receiving, from a server, one or more segments of program code embedded in a webpage having an origin;
    receiving information on a user's prior code invocation behavior of code on webpages from the origin;
    selecting a level of performance optimization for the one or more segments of the program code in advance of compilation of the segments of the program code based on, at least, the received information, and wherein the level of performance optimization specifies a type of program code compilation optimization for the one or more segments; and
    performing the selected level of performance optimization on the one or more segments of the program code.

8. The computer storage medium of claim 7, wherein selecting the level of performance optimization further comprises:
    receiving second information on aggregated usage behavior on webpages from the origin of the webpage, the aggregated usage behavior being derived from prior usage behaviors of multiple users on the webpages from the origin; and
    selecting the level of performance optimization based on the second information.

9. The computer storage medium of claim 7, wherein selecting the level of performance optimization further comprises:
    receiving a recommendation, the recommendation specifying a recommended level of performance optimization for the webpage; and
    selecting the level of performance optimization based on the recommended level of performance optimization.

10. The computer storage medium of claim 7, wherein the operations further comprise:
    recording a measure of performance improvement due to the selected level of performance optimization being performed during the user's prior visit to another webpage from the origin of the webpage; and
    adjusting, based on the measure of performance improvement, the selected level of performance optimization for the webpage.

11. The computer storage medium of claim 7, wherein the webpage is a search result supplied by a search engine, and the level of performance optimization is selected based on a recommendation by the search engine.

12. A system comprising:
one or more processors;
memory coupled to the one or more processors and operable for storing instructions, which, when executed by the one or more processors, cause the one or more processors to perform operations, comprising:
  receiving, from a server, one or more segments of program code embedded in a webpage having an origin;
  receiving information on a user's prior code invocation behavior of code on webpages from the origin;
  selecting a level of performance optimization for the one or more segments of the program code in advance of compilation of the segments of the program code based on, at least, the received information, and wherein the level of performance optimization specifies a type of program code compilation optimization for the one or more segments; and
  performing the selected level of performance optimization on the one or more segments of the program code.

13. The system of claim 12, wherein selecting the level of performance optimization further comprises:
  receiving second information on aggregated usage behavior on webpages from the origin of the webpage, the aggregated usage behavior being derived from prior usage behaviors of multiple users on the webpages from the origin; and
  selecting the level of performance optimization based on the second information.

14. The system of claim 12, wherein the operations further comprise:
  receiving a recommendation, the recommendation specifying a recommended level of performance optimization for the webpage; and
  selecting the level of performance optimization based on the recommended level of performance optimization.

15. The system of claim 12, wherein the operations further comprise:
  recording a measure of performance improvement due to the selected level of performance optimization being performed during the user's prior visit to another webpage from the origin of the webpage; and
  adjusting, based on the measure of performance improvement, the selected level of performance optimization for the webpage.

16. The system of claim 12, wherein the webpage is a search result supplied by a search engine, and the level of performance optimization is selected based on a recommendation by the search engine.

* * * * *